(No Model.)
C. W. EADER.
TACK DRIVER.
No. 603,626. Patented May 10, 1898.
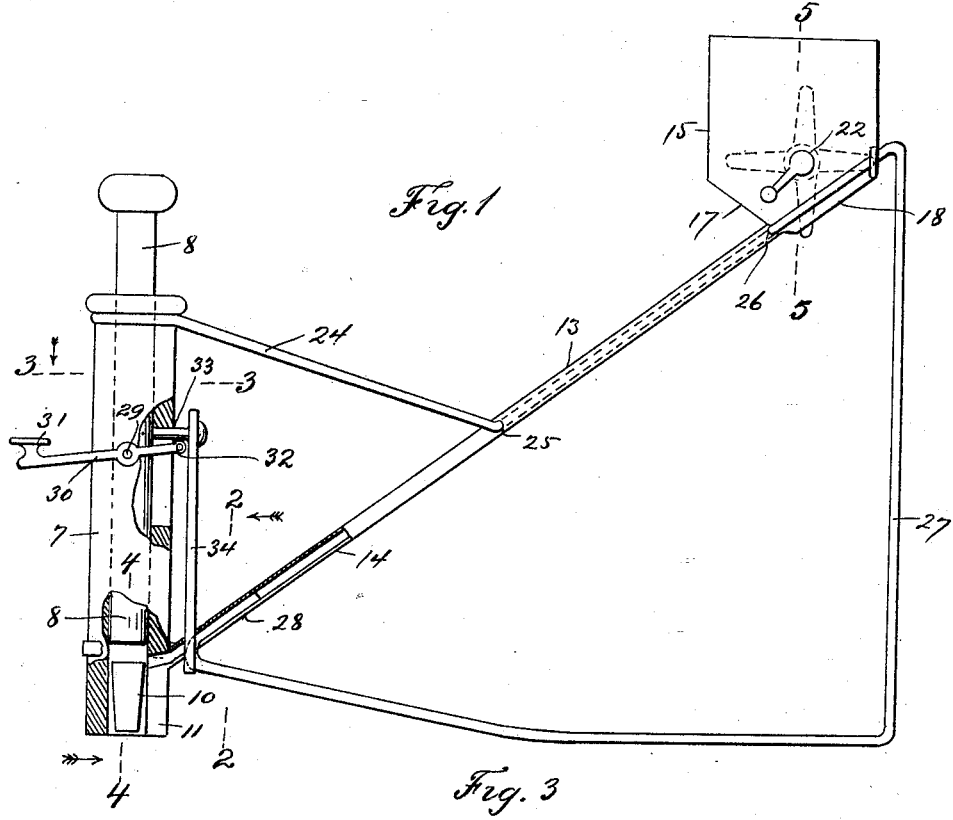
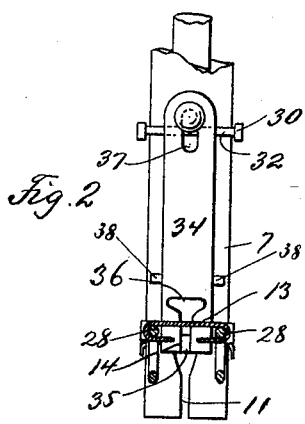
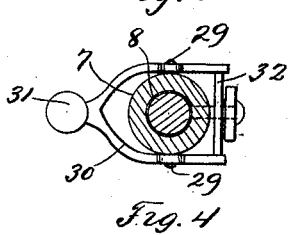
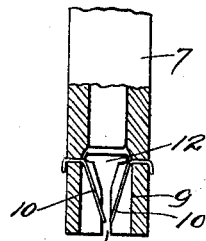
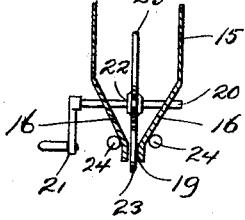
WITNESSES:
INVENTOR
Charles W. Eader.
BY
Edgar Tate & Co
ATTORNEYS.

UNITED STATES PATENT OFFICE.

CHARLES WILLIAM EADER, OF DENVER, COLORADO.

TACK-DRIVER.

SPECIFICATION forming part of Letters Patent No. 603,626, dated May 10, 1898.

Application filed May 4, 1897. Serial No. 635,033. (No model.)

*To all whom it may concern:*

Be it known that I, CHARLES WILLIAM EADER, a citizen of the United States, residing at Denver, in the county of Arapahoe and State of Colorado, have invented certain new and useful Improvements in Tack-Drivers, of which the following is a full and complete specification, such as will enable those skilled in the art to which it appertains to make and use the same.

This invention relates to tack-drivers, and particularly to devices of this class adapted for use in laying carpets; and the object of the invention is to provide an improved device for this purpose which is simple in construction and operation and comparatively inexpensive.

The invention is fully disclosed in the following specification, of which the accompanying drawings form a part, in which—

Figure 1 is a sectional side view of my improved tack-driver; Fig. 2, a section on the line 2 2 of Fig. 1; Fig. 3, a section on the line 3 3 of Fig. 1; Fig. 4, a section on the line 4 4 of Fig. 1, and Fig. 5 a partial section on the line 5 5 of Fig. 1.

In the drawings forming part of this specification the separate parts of my improvement are designated by the same numerals of reference in each of the views, and in the practice of my invention I provide a tubular casing 7, in which is mounted a vertically-movable plunger 8, and the central bore of the tubular casing 7 is enlarged at the lower end thereof, as shown at 9 in Fig. 4, and secured to the opposite sides of the enlarged portion 9 of said central bore are downwardly and inwardly directed springs 10. The lower end of the tubular casing 7 is also provided in the front thereof with a vertical slot 11, which opens downwardly and the upper end of which is enlarged transversely, as shown at 12, and connected with said tubular casing, directly over said enlarged upper end of the slot 11, is an upwardly and outwardly inclined arm 13, which is of the form shown in cross-section in Fig. 2, and which is hollow, and the bottom of which is provided with a longitudinal slot or opening 14.

The inclined arm 13 is preferably composed of sheet metal, and mounted at the upper end thereof is a box 15, the sides of which are inclined inwardly and downwardly, as shown at 16 in Fig. 5, and the forward portion of said box is cut away, as shown at 17, and the rear portion thereof is also cut away diagonally, as shown at 18, and is open, as shown at 19 in Fig. 5, and mounted in said box is a shaft 20, which extends through the bottom portion thereof, and is provided at one end with a crank 21, and mounted on the shaft 20 within the box 15 is a hub or wheel 22, provided with radial arms 23, said arms being long enough to project through the open portion of the bottom of the box, as shown in Fig. 5.

The arm 18 is supported by wires or rods 24, which are coiled around the top of the tubular casing 7 and passed through the sides of said arm, as shown at 25, and carried upwardly to the bottom portion of the box 15 and then passed outwardly through the sides of said arm, as shown at 26, and then backwardly around the bottom portion of said box and then carried downwardly, as shown at 27, so as to form a support for the outer end of said arm, and said wires or rods are then bent horizontally and upwardly and passed into the sides of said arm adjacent to the lower end of the tubular casing 7, as shown at 28 in Figs. 1 and 2.

The ends 28 of the wires or rods 24 do not interfere with the slot 14, and in practice the tacks are placed in the box 15, and by turning the shaft 20 the radial spokes or arms 23 will be turned around in said box, and the tacks will be fed point first through the bottom of said box and into the upper end of the arm 13, and the heads thereof will rest on the bottom of said arm at each side of the slot 14, and said tacks will feed downwardly through said arm and will be discharged through the slot or opening 11 into the lower end of the tubular casing 7.

I also preferably connect with the sides of the tubular casing 7, as shown at 29, a yoke-shaped lever 30, which is provided at one end with a knob or handle 31, and the separate sides of said yoke opposite said knob or handle are connected by a cross-rod 32, and the plunger 8 is provided with a headed pin 33, which passes through a vertical slot in the inner or front side of the tubular casing and from which is suspended a plate 34, which is provided at its lower end with a vertical slot or opening 35, similar to the slot or opening 11 in the lower end of the tubular casing 7, and the upper end of which is enlarged transversely, as shown at 36.

The lower end of the plate 34 passes loosely through the arm 13, and the upper end of said plate is provided with a short longitudinal slot 37 and at each side thereof with lugs or projections 38, which limit the downward movement thereof, and the operation will be readily understood from the foregoing description when taken in connection with the accompanying drawings and the following statement thereof.

The tacks are fed into the upper end of the arm 13 by turning the crank 20, and said tacks are fed downwardly by gravity through said arm, the points thereof projecting through the slot 14 in the bottom of said arm. When the plunger 8 is depressed to its lowest point, the plate 34 also descends and the slot 35 in the lower end thereof will register with the corresponding slot 11 in the lower end of the casing 7 and with the central passage and the slot 14 in the arm 13, and a tack will pass through the bottom of said plate 34 and into the enlarged portion 12 at the upper end of the slot 11 in said casing, and when the plunger is raised this tack will pass into the lower end thereof between the springs 10, and the upper end of the plunger 8 is then struck with a hammer and the plunger is forced downwardly and the tack is driven into position, and at the same time another tack passes through the lower end of the plate 34 and into the upper enlarged portion 12 of the slot 11, and when the plunger is again raised this tack also passes into the lower end of the casing 7 between the springs 10, and the upper end of the plunger is again struck with a hammer, as above described. The plunger is raised by means of the lever 30, and this operation may be continued or repeated as rapidly as desired.

This device is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. In a tack-driver of the character described, a vertically-movable plunger provided at the upper end with a head, a lever pivotally mounted on the casing in which said plunger is mounted and provided with a cross-bar adapted to engage a pin secured to said plunger whereby the same may be elevated, a plate secured to said pin of the plunger and adapted to move therewith, said plate being suspended in a way and being provided with an opening adapted to permit the passage of tacks from said way when the said plate is in a predetermined position, and means for placing tacks in said way, substantially as and for the purpose described.

2. In a tack-driver, the combination with a driver, of a receptacle having the bottom inclined toward said driver, and a slot therein open at one end only, a shaft revolubly mounted in said receptacle, means for revolving the same, a plurality of push-arms mounted on said shaft and adapted to project through said slots successively, and an inclined way in the same straight line with the bottom of said slot, having a slot therein adapted to register with the open end of said first-named slot whereby a passage-way for tacks is formed connecting said receptacle and said driver, substantially as described.

In testimony that I claim the foregoing as my invention I have signed my name, in presence of the subscribing witnesses, this 27th day of April, 1897.

CHARLES WILLIAM EADER.

Witnesses:
GUSTAVE C. BARTELS,
FRANK N. BANCROFT.